(12) United States Patent
Watanabe et al.

(10) Patent No.: US 6,977,102 B2
(45) Date of Patent: Dec. 20, 2005

(54) ABSORBER AND METHOD OF MANUFACTURING THE ABSORBER

(75) Inventors: Haruo Watanabe, Kanagawa (JP); Yasuhito Inagaki, Kanagawa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 10/276,349

(22) PCT Filed: Mar. 12, 2002

(86) PCT No.: PCT/JP02/02313

§ 371 (c)(1),
(2), (4) Date: Feb. 19, 2003

(87) PCT Pub. No.: WO02/072961

PCT Pub. Date: Sep. 19, 2002

(65) Prior Publication Data

US 2003/0170406 A1 Sep. 11, 2003

(30) Foreign Application Priority Data

| Mar. 13, 2001 | (JP) | ............................... 2001-70386 |
| Mar. 13, 2001 | (JP) | ............................... 2001-70387 |
| Mar. 13, 2001 | (JP) | ............................... 2001-70388 |
| Mar. 13, 2001 | (JP) | ............................... 2001-70389 |
| Mar. 13, 2001 | (JP) | ............................... 2001-70390 |

(51) Int. Cl.$^7$ ............................................. B32B 1/02
(52) U.S. Cl. ............... 428/34.1; 428/34.3; 502/527.24; 502/402; 525/332.9; 525/333.5; 525/344; 525/354
(58) Field of Search .............................. 428/34.1, 34.3; 502/527.24, 402; 525/332.9, 333.5, 344, 525/354

(56) References Cited

U.S. PATENT DOCUMENTS

| 3,635,819 A | * | 1/1972 | Kaiser ........................ 210/634 |
| 4,418,163 A | * | 11/1983 | Murakami et al. .......... 523/205 |
| 5,185,313 A | * | 2/1993 | Porath ........................ 502/402 |
| 5,279,745 A | * | 1/1994 | Jeffers et al. ................ 210/688 |
| 5,624,967 A | * | 4/1997 | Hitomi et al. ................. 521/64 |
| 6,476,152 B1 | * | 11/2002 | Valkanas ................. 525/329.2 |

FOREIGN PATENT DOCUMENTS

| JP | 60-44603 | 3/1985 |
| JP | 2001-81752 | 3/2001 |
| JP | 2002-86624 | 3/2002 |

OTHER PUBLICATIONS

JPO website Machine English translation, JP 2001081752A, Mar. 2001, Watanabe et al.*
USPTO English Translation, JP Patent Application Publication 04-203110, Jul. 1992, Masahiro et al.*

(Continued)

Primary Examiner—Harold Pyon
Assistant Examiner—Sow-Fun Hon
(74) Attorney, Agent, or Firm—Sonnenschein, Nath & Rosenthal LLP

(57) ABSTRACT

According to the present invention, a water absorbent material and materials to be sucked included in a water permeable bag type member form a water absorber. Thus, the water absorber is small both in weight and volume upon its transportation, and accordingly, the water absorber can be rapidly conveyed in large quantities without depending on a human power. The water absorber absorbs water upon its use to adequately satisfy a function of a form traceability for weight, volume and outline.

2 Claims, 6 Drawing Sheets

OTHER PUBLICATIONS

Hematite, Wikipedia the free encyclopedia, 2004.*
WO 99/21897, Valkanas, Jun. 1999.*
The Merck Index, tenth edition, p. 1289, Sulfur Trioxide, Windholz et al., 1983.*

* cited by examiner

ABSORBER AND METHOD OF MANUFACTURING THE ABSORBER

This application is a 371 of PCT/JP02/02313 filed Mar. 12, 2002.

BACKGROUND OF THE INVENTION

The present invention relates to a water absorber used for removing unnecessary water remaining due to water leakage or flood, etc., further a water absorber having a function as a sandbag for raising an embankment or preventing and restoring the collapse of the embankment in the overflow of rivers and a method for conveying it.

For water absorbers used for removing unnecessary water remaining due to water leakage or flood, etc., fibrous materials such as cloths have been employed. However, when a large amount of water needs to be removed because of the rupture of city water pipes due to the disaster of earthquake, etc., a large-scale flood in a broad area due to a flood damage, or the water leakage from the tanks of a factory and so on, the conventional water absorbers as mentioned above have not been provided with sufficient water absorbing power.

The water absorbers having the functions of sandbags are made of materials of construction for preventing the overflow of rivers, lakes, marshes, etc. in flood damages, and, for instance, linen bags filled with soil have been conventionally used. Since both the weight and volume of such conventional water absorbers are large, it has been difficult to convey them. Accordingly, these water absorbers have been manufactured in a place near the spot. When a disaster happens, the water absorbers having the functions of sandbags need to be rapidly applied to a necessary place at a necessary time. In most of the conventional water absorbers, however, the manufacture of them cannot meet a desired amount of them. When the water absorbers are conveyed from a remote place, they need to be conveyed by using vehicles and it takes labor to unload them. Further, the vehicles cannot possibly move to the spot of disaster due to the break-down of roads. Under these circumstances, many life properties of the mankind may have been lost.

As described above, the conventional water absorbers employed for removing unnecessary water remaining due to the water leakage or flood or the like, or the water absorbers having the functions of sandbags are large in both their weight and volume, so that it is troublesome to transport them. Thus, water absorbers small both in their weight and volume and capable of being easily conveyed are eagerly demanded.

SUMMARY OF THE INVENTION

It is an object of the present invention to provide a water absorber for removing unnecessary water or a water absorber having a function as a sandbag which is small in its weight and volume upon transportation, can be rapidly conveyed in large quantities using no human power, and absorbs water upon its use to adequately satisfy a function of a form traceability for the weight, volume and an outline.

It is another object of the present invention to provide a water absorber which can be repeatedly used by drying and has a form stability.

It is a still another object of the present invention to provide a water absorber in which the adhesion and breeding of microorganisms due to the repeated use can be suppressed.

It is a still another object of the present invention to provide a water absorber having a water absorbing property and water absorbing speed higher than those of a conventional water absorber used for removing unnecessary water remaining due to a water leakage or flood, etc., or a water absorber having a function of a sandbag.

It is a further object of the present invention to provide a method for conveying a water absorber used for removing unnecessary water remaining due to a water leakage or flood, etc., or a water absorber having a function of a sandbag which can be rapidly and simultaneously conveyed in large quantities even to a risky place for persons to convey the water absorbers.

It is still further object of the present invention to provide a water absorber suitable for a conveying method according to the present invention, that is, a water absorber for removing unnecessary water or a water absorber having a function of a sandbag which is small in its weight and volume upon transportation, can be rapidly conveyed in large quantities without depending on a human power, and absorbs water upon its use to adequately satisfy a function of a form traceability for the weight, volume and an outline.

It is a still further object of the present invention to contribute to a global environment by utilizing, for instance, polymer wastes such as resins, or inorganic solid wastes such as metals or ceramics which have been hardly disposed as waste to obtain products with higher added values.

The inventors of the present invention especially studied about the transportation characteristics of the water absorbers, and accordingly, they obtained a knowledge that when materials to be sucked were provided together with the water absorbers, the water absorbers could be rapidly transported in large quantities at a time without depending on the human power. For instance, when magnetic materials are used as the materials to be sucked, the water absorbers can be rapidly conveyed in large quantities at a time by a crane or a belt conveyor by magnetically sucking the water absorbers. Further, the inventors recognized that when the inorganic solid wastes such as the metals or ceramics were employed as the materials to be sucked for reproducing resources, these materials could advantageously contribute to a global environment, because they were members hardly disposed in a dismantling step of parts of electronic devices.

The inventors of the present invention further eagerly studied to achieve the above-described objects, and accordingly, they obtained an unexpected knowledge that the use of a modified polymer compound manufactured by introducing an acidic group to a polymer compound including acrylonitrile and styrene and/or conjugated dienes made it possible to simultaneously achieve the above-described objects. That is, since the above-described compound has a water absorbing property and absorbs water to gel, there can be provided the water absorber high in its functionality for removing unnecessary water or the water absorber having a function as a sandbag which is small both in weight and volume upon its transportation and absorbs water upon its use to adequately satisfy the function of a form traceability for the weight, volume and outline. Further, since the water absorber using the modified polymer compound as a water absorbent material has a water absorbing speed higher than that of the conventional sandbag, this water absorber has an excellent utility to meet an emergent use. Still further, the water absorber of the present invention can advantageously contribute to a global environment by using the polymer wastes such as resins which have been hardly disposed as waste to reproduce them as resources.

The inventors of the present invention further studied about the water absorber and thus obtained an unexpected knowledge that the salt was formed with metal in the acidic group included in the modified compound so that an antimicrobial property could be applied to the compound. In such a way, the antimicrobial property is applied to the water absorber, and accordingly, the adhesion and breeding of microorganisms resulting from the repeated use of the water absorber and the discoloration of the water absorber or offensive odor caused therefrom can be suppressed.

Still further, as a result of the study about the improvement of the water absorbing property and the water absorbing speed of the water absorber, the inventors found an unexpected knowledge that a surface active agent was included together with the modified polymer compound so that the wetness of the water absorber could be improved, and consequently, the water absorbing speed could be improved.

Specifically, a water absorber according to the present invention includes a water absorbent material and materials to be sucked in a water permeable bag type member. As the materials to be sucked, magnetic materials are used.

The water absorbent material includes as a main component, a modified polymer compound manufactured by introducing an acidic group to a polymer compound including acrylonitrile and at least one or more kinds of styrene and/or conjugated dienes. Further, a supporter is included in the water permeable bag type member. For the supporter, a flexible network member is employed.

Further, the water absorbent material includes, as a main component, a modified polymer compound manufactured by introducing an acidic group to a polymer compound including acrylonitrile and at least one or more kinds of styrene and/or conjugated dienes and the water absorbent material is supported by the supporter.

The polymer compound including acrylonitrile and at least one or more kinds of styrene and/or conjugated dienes is obtained from wastes.

Further, in the water absorber according to the present invention, solid materials of specific gravity of 1 or higher are included in the water permeable bag type member. The solid materials of specific gravity of 1 or higher are composed of natural minerals. Further, the solid materials of the specific gravity of 1 or higher are composed of waste. Still further, the solid materials of the specific gravity of 1 or higher are formed by binding waste.

The water absorbent material includes a salt forming modified polymer compound manufactured by introducing an acidic group to the polymer compound including acrylonitrile and at least one or more kinds of styrene and/or conjugated dienes to form a salt together with metal. The metal is one or two or more kinds of metals selected from a group including zinc, copper and silver.

Further, the water absorber according to the present invention includes a surface active agent in the water permeable bag type member. The surface active agent is an anionic surface active agent and/or a non-ionic surface active agent.

Magnetic materials are composed of waste, or the magnetic materials are formed by binding waste.

Further, in the water absorber according to the present invention, the water absorbent material including as a main component, a modified polymer compound manufactured by introducing an acidic group to a polymer compound including acrylonitrile and at least one or more kinds of styrene and/or conjugated dienes obtained from wastes and the magnetic materials are included in the water permeable bag type member.

The water absorber further includes a supporter in the water permeable bag type member.

For the supporter, a flexible network member is used. The water absorbent material is supported by the supporter.

In the water absorber according to the present invention, solid materials of specific gravity of 1 or higher are put in the water permeable bag type member. The solid materials of specific gravity of 1 or higher are composed of natural minerals. Further, the solid materials of specific gravity of 1 or higher are composed of waste. Still further, the solid materials of the specific gravity of 1 or higher are formed by binding waste.

The water absorbent material includes a salt forming modified polymer compound manufactured by introducing an acidic group to the polymer compound including acrylonitrile and at least one or more kinds of styrene and/or conjugated dienes to form a salt together with metal. The metal is composed of one or two or more kinds of metals selected from a group including zinc, copper and silver.

In the water absorber according to the present invention, a surface active agent is put in a water permeable bag type member.

The surface active agent is an anionic surface active agent and/or a non-ionic surface active agent.

Magnetic materials are composed of waste or formed by binding waste.

Additionally, according to a method for producing a water absorber of the present invention, a water absorbent material and materials to be sucked are put in a water permeable bag type member. The materials to be sucked are magnetic materials. The water absorbent material uses as a main component a modified polymer compound manufactured by introducing an acidic group to a polymer compound including acrylonitrile and at least one or more kinds of styrene and/or conjugated dienes.

In the method for producing a water absorber according to the present invention, a supporter is put in the water permeable bag type member. For the supporter, a flexible network member is used.

Further, the water absorbent material uses as a main component a modified polymer compound manufactured by introducing an acidic group to a polymer compound including acrylonitrile and at least one or more kinds of styrene and/or conjugated dienes.

The polymer compound including acrylonitrile and at least one or more kinds of styrene and/or conjugated dienes is obtained from wastes.

In the method for producing a water absorber according to the present invention, solid materials of specific gravity of 1 or higher are put in the water permeable bag type member.

The solid materials of specific gravity of 1 or higher are composed of natural minerals or waste. The solid materials are further formed by binding waste.

The water absorbent material employed in the method for producing a water absorber according to the present invention includes a salt forming modified polymer compound manufactured by introducing an acidic group to a polymer compound including acrylonitrile and at least one or more kinds of styrene and/or conjugated dienes to form a salt together with metal. Here, the metal is composed of one or two or more kinds of metals selected from a group including zinc, copper and silver.

In the method for producing a water absorber according to the present invention, a surface active agent is put in the water permeable bag type member. For the surface active agent, an anionic surface active agent and/or a non-ionic surface active agent are used.

Magnetic materials are composed of waste and formed by binding waste.

Further, in the method for producing a water absorber according to the present invention, the water permeable bag type member is filled with a water absorbent material including as a main component a modified polymer compound manufactured by introducing an acidic group to the polymer compound including acrylonitrile and at least one or more kinds of styrene and/or conjugated dienes obtained from wastes and magnetic materials.

In the method for producing a water absorber according to the present invention, a supporter is put in the water permeable bag type member. For the supporter, a flexible network member is used. The water absorbent material is supported by the supporter.

In the method for producing a water absorber according to the present invention, solid materials of specific gravity of 1 or higher are put in the water permeable bag type member. The solid materials with which the water permeable bag type member is filled are composed of natural minerals of specific gravity of 1 or higher, or waste and further formed by binding waste.

The water absorbent material includes a salt forming modified polymer compound manufactured by introducing an acidic group to a polymer compound including acrylonitrile and at least one or more kinds of styrene and/or conjugated dienes obtained from wastes forms a salt together with metal. Here, the metal is composed of one or two or more kinds of metals selected from a group including zinc, copper and silver.

In the method for producing a water absorber according to the present invention, a surface active agent is put in the water permeable bag type member. For the surface active agent, an anionic surface active agent and/or a non-ionic surface active agent are used.

Magnetic materials are composed of waste or formed by binding waste.

Further, in the water absorber according to the present invention, a modified polymer compound and a supporter are put in the water permeable bag type member, the modified polymer compound being manufactured by introducing an acidic group to the polymer compound including acrylonitrile and at least one or more kinds of styrene and/or conjugated dienes is obtained from wastes and a supporter. For the supporter, a flexible network member is used. The modified polymer compound is supported by the supporter.

The solid materials of specific gravity of 1 or higher used in the water absorber according to the present invention are included in the water permeable bag type member. The solid materials of specific gravity of 1 or higher are composed of natural minerals, waste, formed by binding waste, or composed of waste having a magnetism.

Further, in the method for producing a water absorber according to the present invention, a modified polymer compound and a supporter are put in the water permeable bag type member, the modified polymer compound being manufactured by introducing an acidic group to a polymer compound including acrylonitrile and at least one or more kinds of styrene and/or conjugated dienes is obtained from wastes and a supporter. For the supporter, a flexible network member is employed. The modified polymer compound is supported by the supporter.

Solid materials of specific gravity of 1 or higher used in the method for producing a water absorber according to the present invention are included in the water permeable bag type member. The solid materials are composed of natural mineral, waste, formed by binding waste, or composed of waste having a magnetism.

Further, in the method for producing a water absorber according to the present invention, a modified polymer compound and a supporter are put in the water permeable bag type member, the modified polymer compound being manufactured by introducing an acidic group to a polymer compound including acrylonitrile and at least one or more kinds of styrene and/or conjugated dienes to form a salt together with metal and a supporter. For the supporter, a flexible network member is employed. The modified polymer compound is supported by the supporter. Here, the metal is composed of one or two or more kinds of metals selected from a group including zinc, copper and silver.

In the water absorber according to the present invention, solid materials having specific gravity of 1 or higher are put in the water permeable bag type member. The solid materials having the specific gravity of 1 or higher used in the water absorber according to the present invention are composed of natural minerals, waste, formed by binding waste, or composed of waste having a magnetism.

Further, in the water absorber according to the present invention, a modified polymer compound and a supporter are put in the water permeable bag type member, the modified polymer compound being manufactured by introducing an acidic group to the polymer compound including acrylonitrile and at least one or more kinds of styrene and/or conjugated dienes is obtained from wastes forms a salt together with metal and a supporter. The polymer compound is composed of wastes. For the supporter, a flexible network member is used. The modified polymer compound is supported by the supporter. Here, the metal is composed of one or two or more kinds of metals selected from a group including zinc, copper and silver.

In the water absorber according to the present invention, solid materials having specific gravity of 1 or higher are included in the water permeable bag type member. The solid materials of specific gravity of 1 or higher used in the water absorber according to the present invention are composed of natural minerals, waste, formed by binding waste, or composed of waste having a magnetism.

Further, in the method for producing a water absorber according to the present invention, the water permeable bag type member a modified polymer compound and a supporter are put in the water permeable bag type member in which an acidic group introduced to the polymer compound including acrylonitrile and at least one or more kinds of styrene and/or conjugated dienes to form a salt together with metal and a flexible network member. The flexible network member is used as a supporter. The modified polymer compound is supported by the supporter. Here, the metal is composed of one or two or more kinds of metals selected from a group including zinc, copper and silver.

In the method for producing a water absorber according to the present invention, solid materials having specific gravity of 1 or higher are included in the water permeable bag type member. The solid materials of specific gravity of 1 or higher used in the water absorber according to the present invention are composed of natural minerals, waste, formed by binding waste, or composed of waste having a magnetism.

Further, in the method for producing a water absorber according to the present invention, a modified polymer compound and a supporter are put in the water permeable bag type member, the modified polymer compound being manufactured by introducing an acidic group to the polymer compound including acrylonitrile and at least one or more kinds of styrene and/or conjugated dienes is obtained from wastes forms a salt together with metal and a supporter. For the polymer compound, wastes are used. For the supporter, a flexible network member is used. The modified polymer compound is supported by the supporter. Here, the metal is composed of one or two or more kinds of metals selected from a group including zinc, copper and silver.

In the method for producing a water absorber according to the present invention, solid materials having specific gravity of 1 or higher are included in the water permeable bag type member. The solid materials of specific gravity of 1 or higher used in the method for producing a water absorber according to the present invention are composed of natural minerals, waste, formed by binding waste, or composed of waste having a magnetism.

Further, in the water absorber according to the present invention, a modified polymer compound and a surface active agent and a supporter are packed in the water permeable bag type member, the modified polymer compound manufactured by introducing an acidic group to the polymer compound including acrylonitrile and at least one or more kinds of styrene and/or conjugated dienes. For the supporter, a flexible network member is used. The modified polymer compound is supported by the supporter. For the surface active agent, there are used an anionic surface active agent and/or a non-ionic surface active agent. The solid materials of specific gravity of 1 or higher used in the water absorber according to the present invention are composed of natural minerals, waste, formed by binding waste, or composed of waste having a magnetism.

Further, in the water absorber according to the present invention, the water permeable bag type member a modified polymer compound and a supporter is put in the water permeable bag type member, the modified polymer compound being manufactured by introducing an acidic group to the polymer compound including acrylonitrile and at least one or more kinds of styrene and/or conjugated dienes obtained from wastes, a surface active agent and a supporter. For the supporter, a flexible network member is used. The modified polymer compound is supported by the supporter. For the surface active agent, there are used an anionic surface active agent and/or a non-ionic surface active agent. Solid materials of specific gravity of 1 or higher are included in the water permeable bag type member. The solid materials of specific gravity of 1 or higher used in the water absorber according to the present invention are composed of natural minerals, waste, formed by binding waste, or composed of waste having a magnetism.

Further, in the method for producing a water absorber according to the present invention, a modified polymer compound and a surface active agent and a supporter are packed in the water permeable bag type member, the modified polymer compound manufactured by introducing an acidic group to the polymer compound including acrylonitrile and at least one or more kinds of styrene and/or conjugated dienes. For the supporter, a flexible network member is used. The modified polymer compound is supported by the supporter. For the surface active agent, there are used an anionic surface active agent and/or a non-ionic surface active agent. Solid materials of specific gravity of 1 or higher are included in the water permeable bag type member. The solid materials of specific gravity of 1 or higher used in the method for producing the water absorber according to the present invention are composed of natural minerals, waste, formed by binding waste, or composed of waste having a magnetism.

Further, in the method for producing a water absorber according to the present invention, a modified polymer compound and a supporter is put in the water permeable bag type member, the modified polymer compound being manufactured by introducing an acidic group to the polymer compound including acrylonitrile and at least one or more kinds of styrene and/or conjugated dienes obtained from wastes, a surface active agent and a supporter. For the supporter, a flexible network member is used. The modified polymer compound is supported by the supporter. For the surface active agent, there are used an anionic surface active agent and/or a non-ionic surface active agent. Solid materials of specific gravity of 1 or higher are included in the water permeable bag type member. The solid materials of specific gravity of 1 or higher used in the method for producing the water absorber according to the present invention are composed of natural minerals, waste, formed by binding waste, or composed of waste having a magnetism.

The present invention relates to a method for conveying a water absorber in which the water absorber including a water absorbent material and materials to be sucked in a water permeable bag type member by sucking. The water absorber including the water absorbent material and magnetic materials in the water permeable bag type member is magnetically sucked.

The water absorbent material includes as a main component, a modified polymer compound manufactured by introducing an acidic group to a polymer compound including acrylonitrile and at least one or more kinds of styrene and/or conjugated dienes. The water absorber further includes a supporter in the water permeable bag type member. For the supporter, a flexible network member is used.

The water absorbent material includes, as a main component, a modified polymer compound manufactured by introducing an acidic group to a polymer compound including acrylonitrile and at least one or more kinds of styrene and/or conjugated dienes and the water absorbent material is supported by the supporter.

The polymer compound including acrylonitrile and at least one or more kinds of styrene and/or conjugated dienes is obtained from wastes.

The water absorber further includes solid materials of specific gravity of 1 or higher in the water permeable bag type member. The solid materials of specific gravity of 1 or higher used in the method for conveying a water absorber according to the present invention are composed of natural minerals, waste, formed by binding waste, or waste having a magnetism.

The water absorbent material includes a salt forming modified polymer compound manufactured by introducing an acidic group to the polymer compound including acrylonitrile and at least one or more kinds of styrene and/or conjugated dienes to form a salt together with metal. Here, the metal is composed of one or two or more kinds of metals selected from a group including zinc, copper and silver.

Further, a surface active agent is included in the water permeable bag type member. For the surface active agent, there are employed an anionic surface active agent and/or a non-ionic surface active agent.

Magnetic materials are composed of waste, or the magnetic materials are formed by binding waste.

The present invention concerns a method for conveying a water absorber in which the water absorber including a water absorbent material having, as a main component, a modified polymer compound manufactured by introducing an acidic group to a polymer compound including acrylonitrile and at least one or more kinds of styrene and/or conjugated dienes obtained from wastes and magnetic materials in a water permeable bag type member is magnetically sucked. The water absorber further includes a supporter in the water permeable bag type member. For the supporter, a flexible network member is used. The water absorbent material is supported by the supporter. The water absorber further includes solid materials of specific gravity of 1 or higher in the water permeable bag type member. Solid materials of specific gravity of 1 or higher used in the method for conveying a water absorber according to the present invention are composed of natural minerals, waste, formed by binding waste, or waste having a magnetism.

The water absorbent material includes a salt forming modified polymer compound manufactured by introducing an acidic group to the polymer compound including acrylonitrile and at least one or more kinds of styrene and/or conjugated dienes obtained from wastes forms a salt together with metal. Here, the metal is composed of one or two or more kinds of metals selected from a group including zinc, copper and silver.

Further, the water absorber includes a surface active agent in the water permeable bag type member. For the surface active agent, there are employed an anionic surface active agent and/or a non-ionic surface active agent.

As magnetic materials, waste or materials formed by binding waste is employed.

Still further objects of the present invention and specific advantages obtained by the present invention will be more apparent hereinafter from the description of embodiments by referring to the drawings.

DETAILED DESCRIPTION OF THE PRESENTLY PREFERRED EMBODIMENTS

Figure 1:
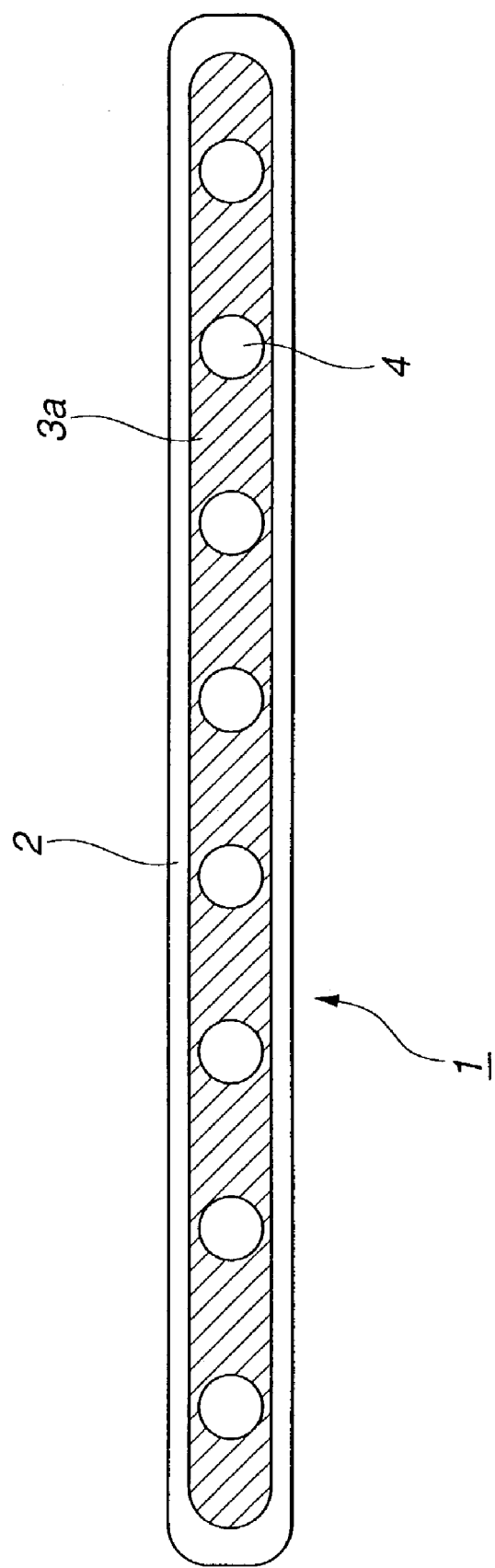
FIG. 1 is a sectional view of a water absorber according to the present invention when the water absorber is dried.
Figure 2:
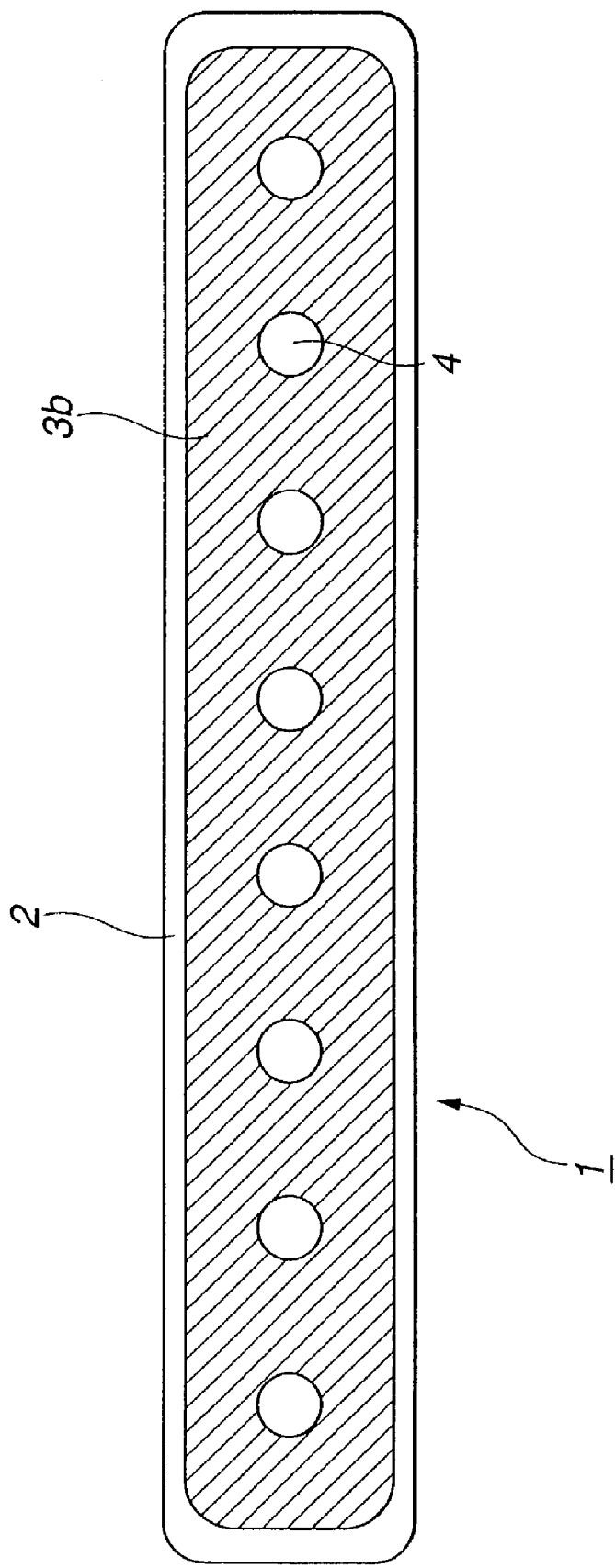
FIG. 2 is a sectional view of the water absorber according to the present invention when the water absorber absorbs water to swell.

Now, embodiments of the present invention will be described in detail by referring to the drawings. As a water absorber for removing unnecessary water or a water absorber having a function of a sandbag to which the present invention is applied, a water absorber 1 as shown in FIGS. 1 to 4 will be described below.

Figure 3:
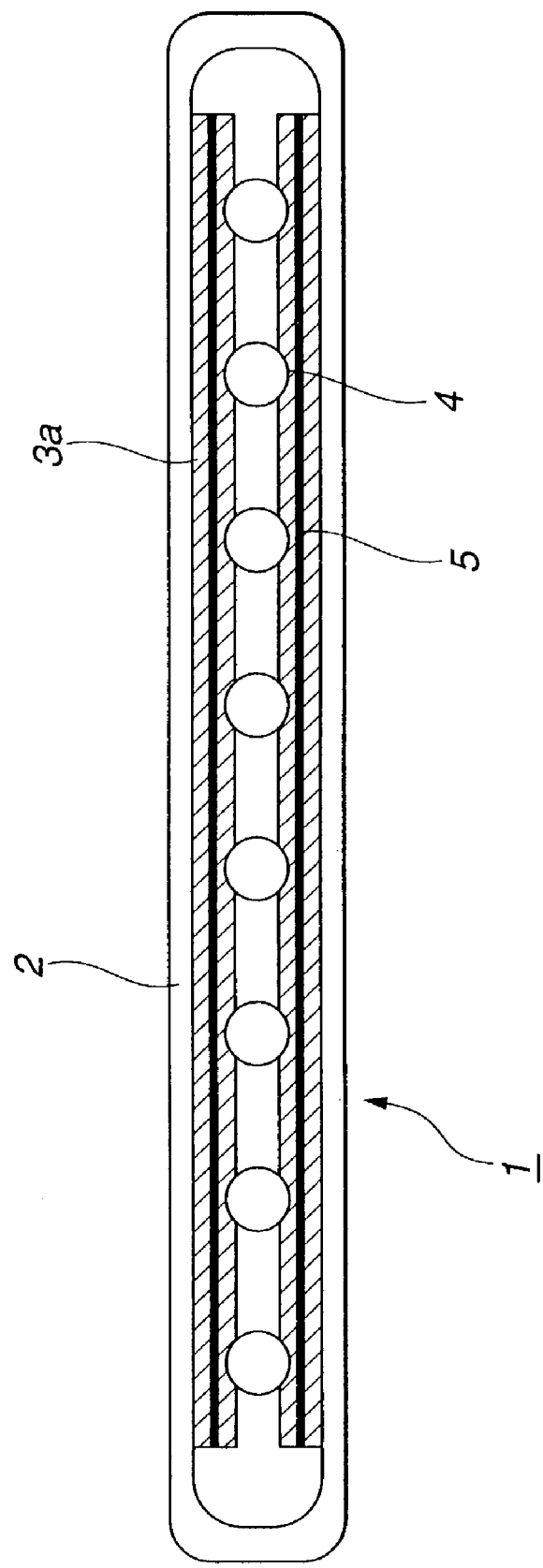
FIG. 3 is a sectional view of a water absorber including a supporter according to the present invention when the water absorber is dried.
Figure 4:
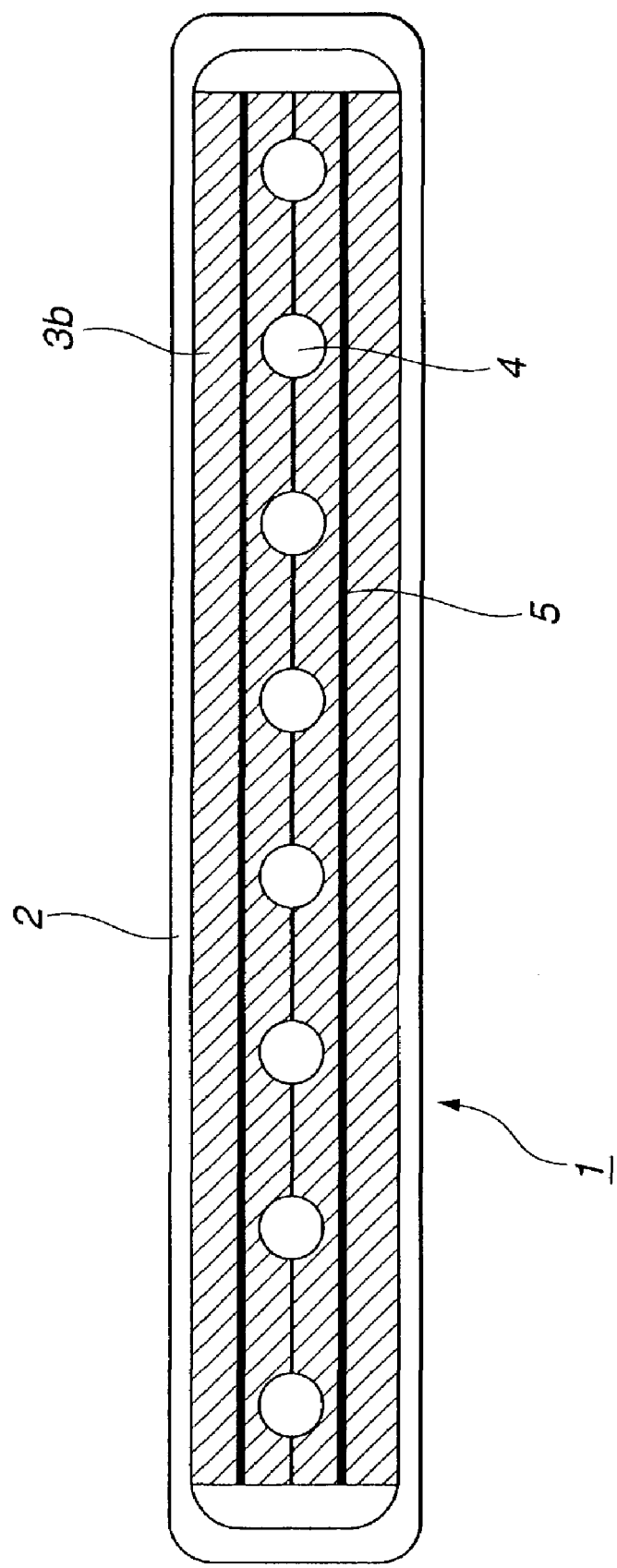
FIG. 4 is a sectional view of the water absorber including the supporter according to the present invention when the water absorber absorbs water to swell.

The water absorber 1 for removing unnecessary water or the water absorber 1 having a function as a sandbag comprises a water permeable bag type member 2, a water absorbent material 3 and materials 4 to be sucked included in the water permeable bag type member 2. More specifically, the water absorber 1 for removing unnecessary water or the water absorber 1 having a function of a sandbag comprises, in its dried state, the water absorbent material 3a and the materials 4 to be sucked as shown in a sectional view of FIG. 1, and comprises, in its water absorbing and swelling state, the water absorbent material 3b including a modified polymer compound and the materials 4 to be sucked as shown in a sectional view of FIG. 2. Further, a sectional view of a water absorber 1 including a supporter 5 according to the present invention in its dried state is shown in FIG. 3 and a sectional view of the water absorber 1 in its water absorbing and swelling state is shown in FIG. 4.

As the water absorbent material 3 according to the present invention, a water absorbent material well-known in itself may be employed. Preferably, is used a water absorbent material including, as a main component, a modified polymer compound manufactured by introducing an acidic group to a polymer compound including acrylonitrile and at least one or more kinds of styrene and/or conjugated dienes.

As the polymer compounds used in the present invention and including acrylonitrile and at least one or more kinds of styrene and/or conjugated dienes, an acrylonitrile unit is included within a range of about 5 to 80 mole % in the polymer compound, preferably included within a range of about 10 to 60 mole % and more preferably included within a range of about 20 to 50 mole %. For allowing a modified polymer compound obtained by acidifying the polymer compound to effectively function as a water absorbent polymer compound without substantially showing a water solubility, the above-described content of acrylonitrile unit is preferably about 5 mole % or more. Further, in order to prevent the polymer compound from being cured, to allow the polymer compound to be easily pulverized to small pieces in a producing step of the water absorber according to the present invention, however, to prevent the content of styrene and/or conjugated diene units in the polymer compound from being reduced and the introduction rate of an acidic group from being lowered, and to achieve a water absorptivity especially for aqueous electrolyte solution, the above-described content is preferably about 80 mole % or lower.

As the polymer compounds used in the present invention, are desirably employed polymer compounds including at least one or more kinds of styrene and/or conjugated dienes as component units except acrylonitrile, such as butadiene or isoprene, of about 20 to 95 mole %, preferably of about 40 to 85 mole % and more preferably of about 50 to 80 mole %.

These component units such as the styrene and/or conjugated dienes are required in order to introduce an acidic group to the polymer compound by acidifying the polymer compound and to improve the water absorptivity of the absorbent polymer compound to be purified, especially a water absorptivity to the aqueous electrolyte solution.

When a prescribed amount of acrylonitrile and styrene and/or conjugated dienes is included in the polymer compound used in the present invention, still another component units may be included.

Although these other component units are not especially limited to specific materials, there may be enumerated, for example, maleic anhydride, itaconic anhydride, α-methyl styrene, acrylamide, methacrylamide, acrylic acid or acrylic ester, methacrylic acid or methacrylic ester, vinyl acetate, vinyl chloride, ethylene, propylene, butylene, vinyl pyrrolidone, or vinyl pyridine, etc. Acrylic ester and methacrylic ester preferably have the number of carbons of about 1 to 10 and may be saturated or unsaturated.

The weight average molecular weight (Mw) of the polymer compound used in the present invention is ordinarily located within a range of about 1,000 to 20,000,000, and preferably within a range of about 10,000 to 1,000,000. For allowing a modified polymer compound obtained when the polymer compound is acidified to effectively function as a water absorbent polymer compound without substantially showing a water solubility, the weight average molecular weight (Mw) is preferably about 1,000 or more. Further, in order to efficiently advance an acidifying reaction for introducing an acidic group to a copolymer and reduce a reaction time, the weight average molecular weight (Mw) is preferably about 20,000,000 or smaller.

As the polymer compounds employed in the present invention, there are preferably used polymer materials including, for instance, ABS (acrylonitrile-butadiene-styrene) resin, SAN (styrene-acrylonitrile) resin, ASA (acrylonitrile-styrene-acrylamide) resin, ACS (acrylonitrile-chlorinated polyethylene-styrene) resin, AAS (acrylonitrile-acrylate-styrene) resin, NBR (acrylonitrile-butadiene) rubber, etc. These materials may be newly produced and unused granular resins (virgin pellets) or used resins formed for the purpose of a specific use or wastes. As the wastes, there are exemplified, for example, waste products (incomplete products) in the process of production of resin materials or molded products, casings or various kinds of parts materials which have been already used for electric products or motor vehicles, etc., tubes or hoses, or various kinds of cushioning materials, etc. The used resins mean resins recovered from the above-mentioned wastes, etc. The wastes in the present invention may be any of those discharged from factories, shops, homes, etc. Since most of the wastes, for instance, incomplete products, or the like recovered from the factories or the shops have compositions relatively more uniform than general waste from the homes or the like, they are more desirable.

As the polymer compounds used in the present invention, alloy materials of the above-described polymer materials and other resins may be used. For instance, there may be employed the used resins or the wastes including well-known addition agents such as a pigment, a stabilizer, a flame retarder, a plasticizer, a filler, other adjuvants, etc. Further, the mixture of the used resins or the wastes with the unused materials (virgin materials) may be used.

As other resins to be mixed with the polymer materials in the alloy materials, resins which have been well-known in themselves may be used and such resins as not to interfere with the acidifying process of the present invention are preferable. As such resins, there may be specifically exemplified, for instance, polyphenylene ether, polycarbonate, polyphenylene sulfide, polyethylene terephthalate, polybutylene terephthalate, polyamide, polyester, etc. The amount of mixture of these resins is preferably about 60 wt % or lower relative to the polymer materials in order to smoothly advance the acidifying process.

The polymer compound employed in the present invention is preferably pulverized to small pieces for convenience in the acidifying process to introduce an acidic group thereto. Methods for pulverizing the polymer compound into small pieces are not especially limited specific methods, however, there may be exemplified the following methods. For instance, there is used a method in which the polymer compound is pulverized by a pulverizer, and then, the small pieces are screened. Specially, when the polymer compound includes a rubber component, the polymer compound is preferably pulverized after a freezing treatment. Further, there may be used a method that the polymer compound is heated and melted to pelletize it into very small beads. The size of the small pieces of the polymer compound is preferably set to about 3.5 meshes or smaller. The above-described range is desirable to increase the surface area of a material made to react, easily perform an acidifying reaction, decrease a reaction time, increase acidic group density in forming the acidic group in the acidifying process and improve a water absorptivity (performance as the water absorbent polymer compound).

When inorganic materials are further included in the polymer compound of the present invention, the acidifying process for introducing the acidic group thereto is accelerated. That is, the periphery of an inorganic pigment is liable to be acidified and the inorganic pigment departs from the polymer compound upon reaction and an acid easily filtrates into the surface of the polymer compound. Accordingly, the acidic group density is increased in forming the acidic group due to the acidifying process to improve the water absorptivity. Therefore, in the present invention, the inorganic materials are preferably included in the polymer compound of the present invention.

As the inorganic materials, carbon black or/and titanium oxide are preferable. These carbon black and titanium oxide may be those ordinarily used as, for instance, a coloring agent, a reinforcing agent and an electrically conductive additive. Specifically, the carbon black may be produced by any method of, for instance, a channel method, a furnace method, and a thermal method. The methods may be independently used or a plurality of them may be used at the same time. The average particle diameter is ordinarily about 0.005 to 100 m, and preferably, about 0.01 to 10 m. Further, the titanium oxide may be any type of a rutile, an anatase and an ultrafine titanium. These types are respectively independently used or a plurality of them may be used at the same time. The average particle diameter is ordinarily about 0.01 to 50 m, preferably, about 0.05 to 10 m.

The content of the carbon black or the titanium oxide included in the polymer compound is about 0.01 to 20 wt % and preferably about 0.05 to 10 wt % relative to the weight of the polymer compound in a dry state.

As a method for introducing an acidic group to the polymer compound, there is exemplified, for instance, a method for acidifying the polymer compound. The polymer compound is acidified to be converted to a water absorbent polymer compound. More specifically, while a part of acrylonitrile in the polymer compound becomes an amide group, a carboxyl group, or a salt thereof, the acidic group is introduced to styrene or conjugated dienes.

As acids utilized for the acidifying process in the present invention, inorganic acids capable of introducing an acidic group to styrene or conjugated dienes are preferable. As the inorganic acids, there are specifically exemplified, for instance, a sulfonation agent such as concentrated sulfuric acid, sulfuric anhydride, fuming sulfuric acid, chlorosulfonic acid, etc., or nitric acid, fuming nitric acid, phosphoric acid, phosphorus chloride, phosphorus oxide, etc. Concentrated sulfuric acid, sulfuric anhydride, fuming sulfuric acid and chlorosulfonic acid are preferable among them. Specially, the concentrated sulfuric acid of about 70 wt % or higher is more preferable. These inorganic acids may be respectively independently used or two or more kinds of inorganic acids may be used at the same time. When the inorganic acids are used at the same time, they may be mixed together, or gradually added. For instance, the polymer compound is initially treated with concentrated sulfuric acid, and then, sulfuric anhydride is added to the treated polymer compound to obtain a water absorbent polymer compound stable in form. The above-described polymer compound can be obtained, because a nitrile part of the polymer compound firstly mainly undergoes a hydrolytic reaction due to the treatment with the concentrated sulfuric acid, then, styrene or conjugated diene parts are forcedly sulfonate-bridged due to the treatment with sulfuric anhydride so that a water absorbent polymer compound having a high degree of bridging can be obtained. Accordingly, the above-described acidifying process is one of the preferred embodiments of acidifying processes in the present invention.

The amount (charge) of inorganic acids used for the reaction is about 1 to 500 times, preferably about 10 to 200 times as much as the weight of the polymer compound.

To promote the production of an acidic group and to provide an absorptivity by increasing the rate of introduction of the acidic group to styrene or conjugated dienes or the hydrolytic reactivity of an acrylonitrile group, the charge of the inorganic acids is preferably about 1 time as much as the weight of the polymer compound. Further, the charge of the inorganic acids is preferably about 500 times as much as the weight of the polymer compound from the viewpoints of profitability and workability.

The acidifying process in the present invention may be carried out in inorganic acid or may be carried out in a system using an organic solvent.

As organic solvents usable in the acidifying process, there may be enumerated, for instance, aliphatic halogenated hydrocarbons having the number of carbons of about 1 to 2, preferably, 1,2-dichloroethane, chloroform, dichloromethane, 1,1-dichloroethane, etc., aliphatic cyclic hydrocarbons, preferably, cyclohexane, methyl cyclohexane, cyclopentane, etc., nitromethane, nitrobenzene, sulfur dioxide, paraffinic hydrocarbons, preferably, having the number of carbons of about 1 to 7, acetonitrile, carbon disulfide, tetrahydrofuran, tetrahydropyran, 1,2-dimethoxyethane, acetone, methyl ethyl ketone, thiophene, etc. Aliphatic halogenated hydrocarbons having the number of carbons of about 1 to 2, aliphatic cyclic hydrocarbons, nitromethane, nitrobenzene, sulfur dioxide are preferable. These solvents may be independently used or a plurality of solvents may be mixed together to use the mixture. In the mixed solvent, the mixture ratio is not especially limited to a specific value.

The weight of these organic solvents is preferably lower than about 200 times as much as the weight of the polymer compound. The above-described range is preferable in order to enhance the reactivity of the acidifying process and in economical point of view.

In the acidifying process, Lewis bases may be used as desired. As the Lewis bases, there may be exemplified, for instance, alkyl phosphate such as triethyl phosphate, trimethyl phosphate, etc., dioxane, acetic anhydride, ethyl acetate, ethyl palmitate, diethyl ether, thioxane, etc.

In this connection, the inorganic acids or the organic solvents used once in the acidifying process may be recovered as they are after the reaction is completed, or recovered by a method such as sampling or distilling and reused for a reaction.

In the present invention, the polymer compound is subjected to the acidifying process to introduce the acidic group to styrene and/or conjugated dienes and to convert a nitrile group to an amide group or carboxyl group due to a hydrolytic reaction in an acrylonitrile unit, so that the polymer compound is converted to a modified polymer compound having a water absorptivity (water absorbent polymer compound).

As the acidic groups (ionic groups) introduced to styrene or conjugated diene units by the acidifying process, there may be specifically enumerated a sulfonic group which may form salts expressed by a formula —$SO_3M$ (in the formula, M designates a hydrogen atom or cation of metal such as sodium, potassium, etc.), a substituent group which may form salts expressed by a formula —$PO(OM_1)(OM_2)$ or a formula —$CH_2PO(OM_1)(OM_2)$ (in the formulas, $M_1$ and $M_2$ are the same or different from each other and have the same meaning as the above-described M), —$NO_2$, etc. In addition, there may be exemplified a sulfate group which may form salts expressed by a formula —$OSO_3M$ (in the formula, M designates the same meaning as the above-described M), a phospho group which may form salts expressed by a formula —$OPO(OM_1)(OM_2)$ (in the formula, $M_1$ and $M_2$ are the same or different from each other and have the same meaning as the above-described M), a hydroxyl group which may form salts expressed by a formula —$OM_3$ (in the formula, $M_3$ has the same meaning as the above-described M), a carboxyl group which may form salts expressed by a formula —$COOM_4$ (in the formula, $M_4$ designates the same meaning as the above-described M), etc. The sulfonic group or the salts thereof are preferable among these acidic groups. Only one kind of these acidic groups may be introduced to the polymer compound or two or more kinds of acidic groups may be introduced to the polymer compound.

In order to satisfy a performance as the water absorbent polymer compound, the amount of the acidic group included in the modified polymer compound is located within a range of about 5 to 95 mole % relative to all monomer units, and preferably within a range of about 10 to 70 mole %. The amount of the acidic group is preferably about 95 mole % or lower relative to all the monomer units to realize effects that the modified polymer compound does not substantially show a water solubility and effectively shows a water absorptivity. Further, in order to effectively maintain the effect of water absorptivity, the amount of the acidic group is preferably set to about 5 mole % or higher relative to all the monomer units.

When the acidic group in the modified polymer compound is a sulfonic group, a copolymer is made to directly react with the sulfonation agent well-known in itself such as concentrated sulfuric acid sulfuric anhydride, fuming sulfuric acid, chlorosulfonic acid, etc., or the polymer compound is made to react with the sulfonation agent while the polymer compound is dissolved or dispersed in an organic solvent to introduce the sulfonic group thereto, and the obtained material is subsequently neutralized by a basic compound (for instance, sodium hydroxide, potassium hydroxide, etc.) to be converted into sulfonate.

When the acidic group in the modified polymer compound is a —$PO(OH)_2$ group, phosphorus trioxide is added to a solvent, and further, a hydrolysis is carried out to firstly introduce the —$PO(OH)_2$ group, and then, the obtained material is made to react with a basic compound (for instance, sodium hydroxide, potassium hydroxide, etc.) to obtain a salt of the —$PO(OH)_2$ group. When the acidic group in the modified polymer compound is a —$CH_2PO(OH)_2$ group or the salt thereof, the acidic group can be also introduced to the polymer compound by a method well-known in itself.

When the acidic group in the modified polymer compound is a —$NO_2$ group, the mixed solution of sulfuric acid and nitric acid is made to react with the polymer compound to introduce the acidic group to the polymer compound.

As for a method for introducing a sulfate group which may form salts, the polymer compound preferably having unsaturated bonds is made to react with aqueous sulfuric acid solution of high temperature to first introduce the sulfate group thereto, and then, the obtained material is made to react with a basic compound (for instance, sodium hydroxide, potassium hydroxide, etc.) to obtain sulfate.

As for a method for introducing a carboxyl group which may form salts to the polymer compound, n-butyl lithium is preferably added to the polymer compound having aromatic rings, and then, the obtained material is made to react with dry ice to introduce the carboxyl group thereto. Then, the obtained material is made to react with a basic compound (for instance, sodium hydroxide, potassium hydroxide, etc.) to obtain carboxylate.

As for a method for introducing a $-OPO(OH)_2$ group which may form salts to the polymer compound, phosphorus trichloride is preferably added to the polymer compound having unsaturated bonds and then hydrolyzed to firstly introduce the $-OPO(OH)_2$ group thereto, and then, the obtained material is made to react with a basic compound (for instance, sodium hydroxide, potassium hydroxide, etc.) so that a salt of the $-OPO(OH)_2$ group can be obtained.

As for a method for introducing a hydroxyl group which may form salts to the polymer compound, the polymer compound having unsaturated bonds is preferably made to react with aqueous sulfuric acid solution to firstly introduce the hydroxyl group thereto, and then, the obtained material is made to react with a basic compound (for instance, sodium hydroxide, potassium hydroxide, etc.) so that a salt thereof can be obtained.

The acidifying reaction in the present invention is preferably performed under the following conditions to introduce the prescribed amount of acidic group to the copolymer.

Although the reaction temperature is not generally determined since it is greatly different depending on whether or not the organic solvent is used, the reaction temperature is usually located within a range of about 0 to 200° C. and preferably within a range of about 30 to 120° C. The reaction temperature is preferably about 0° C. or higher in order to accelerate a reaction speed to some degree in view of practicability and to obtain a modified polymer compound as a water absorbent polymer compound having a good performance. Further, the reaction temperature is preferably about 200° C. or lower in order to avoid the molecular chains in the polymer compound from being cut due to a thermal decomposition and the modified polymer compound from being dissolved in water.

Although the reaction time in the acidifying process is not generally determined since it is greatly different depending on the reaction temperature, the reaction time is generally about 1 minute to 40 hours, and preferably, about 5 minutes to 2 hours. The above-described range is preferable to adequately advance the reaction and improve a productive efficiency.

In the present invention, the products obtained in the reactions as mentioned above may undergo a post-treatment well-known in itself. Specifically, the products in the reactions are preferably washed. As for methods for washing the products of the reactions, there may be exemplified a method for directly adding the products of the reactions to a large amount of water or aqueous basic solution, or a method for firstly filtering the products of the reactions from a reaction system, and filling a large amount of water or aqueous basic solution with the filtered products, etc. At this time, the nitrile group in the polymer compound is converted to an amide group or a carboxyl group and/or a salt thereof. As basic materials used in the aqueous basic solution, there may be enumerated compounds such as oxides, hydroxides, carbonates, acetates, sulfates, phosphates, etc. of alkali metals (sodium, lithium, potassium, etc.) or alkali earth metals (magnesium, calcium, etc.). In this case, in order to improve the absorbing effect of the modified polymer compound having a water absorptivity (particularly, an absorbing effect to aqueous electrolyte solution) and a deodorizing effect to ammonia gas, only a rinsing operation is desirably carried out without neutralizing.

The product of the reaction obtained as described above is in a state of gel. Then, the product is dried by solar drying, heating, reducing pressure, a centrifugal force, press, etc. to obtain a desired water absorbent polymer compound.

In accordance with the treating methods as described above, the nitrile group and the hydrolytic products thereof (amide group or carboxyl group and/or salt thereof) and the water absorbent polymer compound having the acidic group can be obtained. The water absorbent polymer compound includes a nitrile group having no reaction to improve a water insolubility and gel strength and its water absorptivity (specially, to the aqueous electrolyte solution) is improved due to the hydrolytic product of the nitrile group and the acidic group.

In the present invention, the products obtained in the above-described acidifying process do not undergo a post-treatment and a drying operation, and the above-described post-treatments are carried out as desired after the acidifying process. Then, a salt forming reaction is carried out relative to the obtained acidic group as the product of the acidifying process to produce a salt forming modified polymer compound having an antimicrobial property. In the present invention, the water absorber including such salt forming modified polymer compound in the water absorbent material 3 shows one of preferred embodiments.

As described above, salts, preferably, salts with silver, copper, zinc, etc. are formed to endow the water absorber according to the present invention with the antimicrobial property. The endowment of the antimicrobial property makes it possible to suppress the adhesion and breeding of microorganisms due to the repeated use of the water absorber, the discoloration of the water absorber and the offensive odor of the water absorber caused therefrom.

For forming a salt in the acidic group in the acidifying process, a well-known post-treatment is carried out as desired, and then, a well-known method may be employed. As a preferred embodiment, there may be exemplified a method for firstly filtering the product of the reaction in the acidifying reaction system by a filter, then, washing the product with a large amount of water and then, adding a salt of metal such as silver, copper or zinc thereto, or a method for directly adding the reaction product system to the aqueous solution of metal salt such as silver, copper or zinc.

In the present invention, organic or inorganic salts or hydroxides except the above-described metal salts can be used at the same time. As these salts or hydroxides, there may be exemplified compounds such as hydroxides, carbonates, acetates, sulfates, phosphates, organic salts of ammonium, alkali metals (for instance, sodium, lithium, potassium, etc.), alkali earth metals (for instance, magnesium, calcium, etc.) or other metals (for instance, aluminum, titanium, germanium, tin, iron, etc.).

Further, well-known antimicrobial materials can be properly used at the same time. As the well-known antimicrobial materials, there may be exemplified inorganic antimicrobial materials, organic natural material extractive antimicrobial materials, organoaliphatic compound antimicrobial materials or organoaromatic compound antimicrobial materials, etc.

As the inorganic antimicrobial materials, there may be enumerated chlorine compounds such as sodium hypochlorite, peroxides such as hydrogen peroxide, borate compounds such as boric acid and sodium borate, copper compounds such as copper sulfate, zinc compounds such as zinc sulfate and zinc chloride, sulfur materials such as sulfur, calcium polysulfide and hydrated sulfur, calcium compounds such as calcium oxide, silver compounds such as silver thiosulfate complex and silver nitrate and others such as iodine, sodium silicofluoride, etc.

As the organic natural material extractive antimicrobial materials, there may be exemplified hinokitiol, extract of a Moso-bamboo (*Phyllostachys pubescens*), creosote oil, etc.

As the organoaliphatic compound antimicrobial materials, there may be exemplified organic tin compounds such as tributyltin oxide, cyclopentane derivatives such as copper naphthenate, halides such as methyl bromide, monohydric alcohol compounds such as ethyl alcohol and isopropyl alcohol, dihydric alcohol compounds such as 2-bromo-2-nitro-1,3-propanediol, saturated aldehyde such as formaldehyde and glutaraldehyde, carboxylic acid compounds such as sorbic acid and potassium sorbate, ether compounds such as ethylene oxide and propylene oxide, lactone compounds such as beta-oxypropiolactone, quaternary ammonium compounds such as 3-trimethoxysilyl propyl dimethyl octadecyl ammonium chloride, amino acid derivatives such as di(octylaminoethyl) glycine hydrochloride, sulfonic acid compounds such as sodium lauryl sulfate, hydroxamic acid compounds such as bis-dequalinium acetate, cyanuric acid compounds such as chlorinated isocyanuric acid, cyanic acid compounds such as methyl isocyanate, sulfone compounds such as bis(trichloromethyl) sulfone, guanidine compounds such as polyhexamethylene biguanidine hydrochloride, hydantoin compounds such as 1,3-dichloro-5,5-dimethylhydantoin, dithiol compounds such as 5-oxy-3,4-dichloro-1,2-dithiol, arsine compounds such as iron methylarsinate, phosphate compounds such as aluminum tris(ethylphosphonate), thiocarbamate compounds, etc.

As the organoaromatic compound antimicrobial materials, there are enumerated carbonate compounds such as bis(4-nitro phenyl) carbonate, quaternary ammonium compounds such as benzalkonium chloride and benzethonium chloride, monoamine compounds such as 2,6-dichloro-4-nitroaniline, diamine compounds such as potassium nitroethyl benzyl ethylenediamine, hydroxylamine compounds such as aluminum N-nitroso-N-cyclohexyl hydroxylamine, anilide compounds such as dihydro methyl oxathiin carboxanilide dioxide, imidazole compounds such as 2-(4-thiazolyl) benzimidazole, benzothiazole compounds such as 5-methyl-1,2,4-triazolo-3,4-benzothiazole, triazine compounds such as 2,4-dichloro-6-chloro anilino-1,3,5-triazine, guanidine compounds such as chlorhexidine hydrochloride and chlorhexidine gluconate, pyridine compounds such as cetylpyridinium chloride, pyrimidine compounds such as dimethylpyrazolyl hydroxyphenyl pyrimidine, halogenobenzene compounds such as 2,2'-methylene bis-3,4,6-trichlorophenol, benzenesulfonic acid compounds such as copper hydroxynonyl benzenesulfonate, benzenecarboxylic acid compounds such as benzoic acid, mercaptocarboxylic acid compounds such as thimerosal, hydrocarboxylic acid compounds such as ethyl oxybenzoate, monohydric phenol compounds such as phenol and cresol, dihydric phenol compounds such as resorcinol, phenyl ether compounds such as phenoxyethanol, phenolate compounds such as pentachloro phenyl laurate, phenyl compounds such as triphenyltin oxide, biphenyl compounds such as diphenyl, monohydric naphthol such as beta-naphthol, naphthalene compounds such as monochloro naphthalene, isoquinoline compounds such as dodecyl isoquinolinium bromide, and others such as nitrile compounds, isothiazole compounds, thiadiazole compounds, halogenophenol compounds, pyrrole compounds, quinone compounds, quinoline compounds, organophosphate compounds, etc.

These reaction materials obtained as described above are in a state of gel. Subsequently, they are dried by solar drying, heating, reducing pressure, a centrifugal force, press, etc. to obtain a desired salt forming modified polymer compound having a water absorptivity and an antimicrobial property.

In the present invention, as the water absorbent materials, materials having a simple water absorbing function may be employed. For these materials, well-known water absorbent materials can be used. As these materials, there may be exemplified, gel bridged materials such as polyacrylate, polyvinyl alcohol, polyacrylamide, polyoxyethylene, polyamino acid, poly(N-alkylvinylacetamide), gel bridged materials of copolymers having these units as main components, and reformed materials such as materials bridged or grafted to hydrophilic polymers including polysaccharides such as starch, cellulose, etc.

However, for the purpose of effectively using the used resins or the wastes of the polymer compound including acrylonitrile and styrene or conjugated dienes as materials with higher added values, the above-described modified polymer compound is preferably used and the salt forming modified polymer compound and the well-known water absorbent materials are preferably used together as desired.

Figure 5:
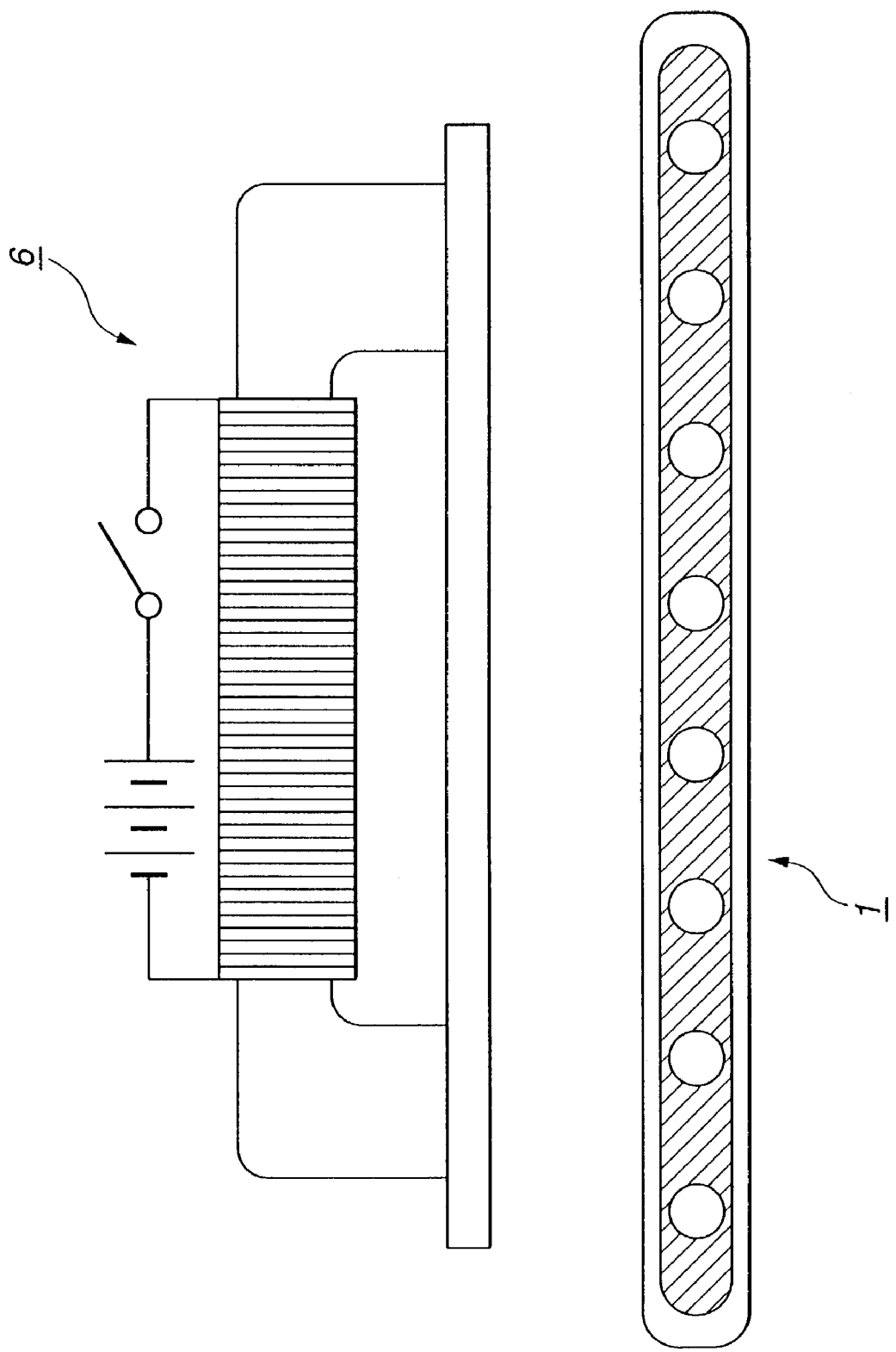
FIG. 5 is a view showing a conveying manner when a water absorber according to the present invention is magnetically sucked and conveyed.
Figure 6:
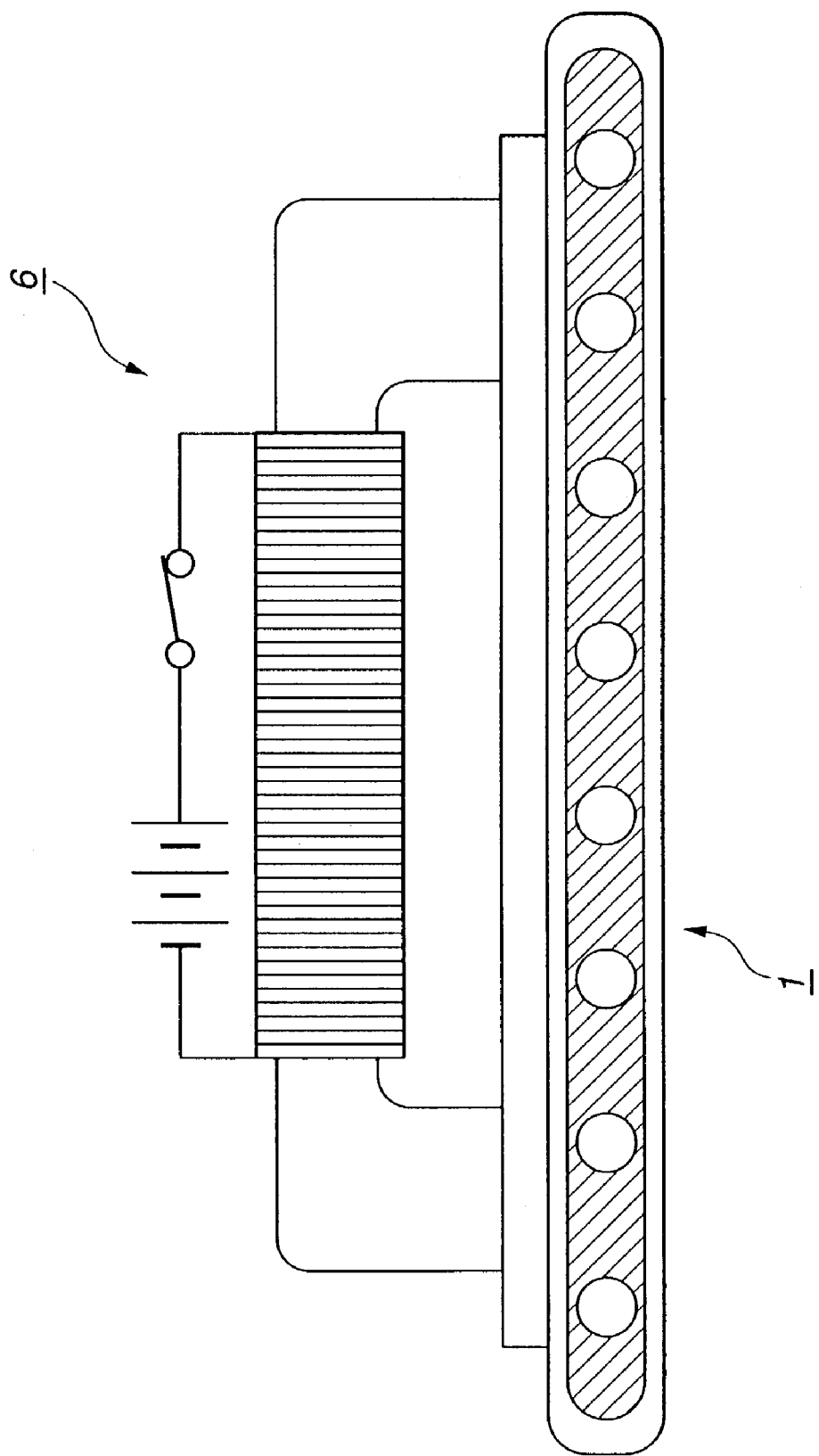
FIG. 6 is a view showing a conveying manner when a water absorber according to the present invention is magnetically sucked and conveyed.

In the present invention, the material 4 to be sucked is included as well as the water absorbent material 3 in the water permeable bag type member. As the material 4 to be sucked, a magnetic material having magnetism is preferably used. The magnetic materials are included as described above, so that the water absorber 1 is magnetically sucked by using a magnetic suction means 6 as shown in FIGS. 5 and 6 and can be moved and conveyed by a conveyor or a crane or the like. Accordingly, the absorber can be advantageously conveyed to a risky place for persons to move and rapidly conveyed upon emergency. Further, the water absorber can be advantageously identified due to its magnetism.

As the materials having the magnetism, there may be exemplified materials having ferrimagnetism, ferromagnetism or parasitic magnetism. More specifically, as the ferromagnetic materials, there may be exemplified iron, nickel, cobalt or alloys of them, alloys including them, transition metals or alloys of them, and alloys including rare earth elements. Further, as the ferrimagnetic materials, there may be exemplified magnetite, maghemite, hematite, manganese zinc ferrite, manganese nickel ferrite, barium ferrite, strontium ferrite, etc. These materials may be composed of natural minerals, waste, or materials formed by binding waste. More specifically, these materials can be obtained from inductor elements or speakers of used electric devices, or the deflection yokes of televisions. Since these members are hardly treated in the dismantling step of electronic devices, they are serviceable in view of effective use of them. Further, a technique for obtaining the ferrite using used dry cells is developed, which can be effectively adapted to the present invention from the above described point of view. These magnetic materials have specific gravity larger than those of ordinary inorganic materials to increase the weight of the water absorber, so that even the water absorber which absorbs water effectively and relatively increases its weight.

As a material for the water permeable bag type member 2 of the present invention, a cloth composed of natural fibers or synthetic fibers is used. As the natural fibers, for instance, cotton, linen, silk, etc. may be exemplified. As the synthetic fibers, there may be exemplified, polyamide, polyimide, polyester, polyethylene, polypropylene, etc. The material is preferably composed of a cloth formed by independently knitting or weaving these fibers or the mixture of them. However, according to circumstances, the material may be made of a nonwoven fabric. Further, according to circumstances, the material may be composed of a film type member having pores passing through the front and back thereof.

In the present invention, a supporter 5 may be included in the water permeable bag type member as well as the water absorbent material 3 and the materials 4 to be sucked. This water absorber is one of preferred embodiments of the present invention.

The form or material of the supporter in the present invention which can support the modified polymer compound is not especially limited to a specific form or material. Here, the "support" may indicate the adhesion or impregnation of the modified polymer compound to prevent the modified polymer compound from being extremely inclined in the water permeable bag type member 2.

As the supporter, a network member having a flexibility is specifically preferable. As the flexible network member, a cloth composed of natural fibers or synthetic fibers is used. As materials of them, the same materials as those of the water permeable bag type member 2 can be used. That is, as natural fibers, for instance, cotton, linen, silk, etc. may be exemplified. As the synthetic fibers, there may be exemplified, polyamide, polyimide, polyester, polyethylene, polypropylene, etc. These fibers are preferably knitted or woven independently or in mixture to form a cloth. However, according to circumstances, the material may be made of a nonwoven fabric or paper. Further, according to circumstances, the material may be composed of a film type member having pores passing through the front and back thereof.

In this case, the supporter, preferably, the network member having a flexibility desirably has an occupation rate of through holes higher than that of the water permeable bag type member 2. Accordingly, the water absorbent modified polymer compound is adhered to the supporter or the supporter is impregnated with the water absorbent modified polymer compound, so that the water absorbent modified polymer compound can be fixed to the supporter. Thus, when the water absorber according to the present invention is repeatedly used in such a manner that the water absorber which absorbs water is used, then dried after using and reused, the water absorbent modified polymer compound can be prevented from being biased to get out of shape in the water absorber. Thus, the number of times of repeated uses can be advantageously increased.

As a method for fixing the water absorbent modified polymer compound to the supporter as a component of the present invention by adhering the modified polymer compound to the supporter or impregnating the supporter with the modified polymer compound, there may be exemplified a method for applying a water dispersion system of the water absorbent modified polymer compound in a water absorbing and swelling state to the supporter to dry it. As another method, there may be exemplified a method for applying to the supporter a dispersion system in organic liquid of the water absorbent modified polymer compound under a non-swelling state to dry it. Thus, since the applying and drying operation can be simplified and consumed energy can be reduced, this method is preferably used in the present invention. Further, as a still another method, there may be employed a method for impregnating the supporter with water or organic liquid, adhering the water absorbent modified polymer compound in a dried state to the supporter and drying the liquid.

A sheet type member fixed to the supporter by adhering the water absorbent modified polymer compound to the supporter or impregnating the supporter with the water absorbent modified polymer compound in accordance with the above-described methods is obtained by performing a compressing operation with a static pressure press or a roller. In this case, the compressing operation can be carried out at room temperature, and more effectively carried out under a heated state at room temperature of higher.

In the present invention, solid materials of specific gravity of 1 or higher can be included in the water permeable bag type member. Thus, the water absorber according to the present invention has an advantage that when the water absorber is used as a sandbag, the water absorber is hardly made to flow by water or the like especially during the initial stage of its installation. Accordingly, such a water absorber is one of preferred embodiments of the present invention.

As the solid materials of specific gravity of 1 or higher, there may be exemplified a solid material made of natural minerals, a solid material made of waste and a solid material formed by binding waste. As materials of them, there are exemplified metal, ceramics, glass, or materials formed by binding them together. For binding them, polymer materials of specific gravity of 1 or lower can be used. The polymer materials used for binding are not especially limited to specific materials. There are enumerated, for example, polystyrene, styrene-propylene copolymer, styrene-butadiene copolymer, styrene-vinyl chloride copolymer, styrene-vinyl acetate copolymer, styrene-acrylic ester copolymer, styrene-methacrylic ester copolymer, polyester resin, polyvinyl alcohol, water soluble resins such as casein, sodium polyacrylate, etc., alcohol soluble resins such as copolymer nylon, methoxymethylated nylon, etc., curing type resins forming three-dimensional network structures such as polyurethane, melamine resin, epoxy resin, etc.

In the present invention, a surface active agent can be further included in the water permeable bag type member. The surface active agent is provided together with the modified polymer compound as described above, so that the wetness of the water absorber can be improved. As a result, the water absorbing speed of the water absorber is advantageously raised. Accordingly, such a water absorber is one of preferred embodiments of the present invention.

As the surface active agents used in the present invention, there are suitably used an anionic surface active agent, a cationic surface active agent, a non-ionic surface active agent and an amphoteric surface active agent. As the anionic surface active agent, there may be exemplified fatty acid salts, higher alcohol sulfate salts, liquid fatty oil sulfate salts, sulfates of aliphatic amine and aliphatic amide, fatty alcohol phosphate salts, sulfonates of dibasic fatty acid ester, fatty acid amide sulfonates, formalin condensed naphthalene sulfonates, etc. As the cationic surface active agent, there may be exemplified fatty acid amine salts, quaternary ammonium salts, alkyl pyridinium salts, etc. As the non-ionic surface active agent, there may be exemplified polyoxyethylene alkyl ether, polyoxyethylene alkylphenol ether, polyoxyethylene alkyl ester, sorbitan alkyl ester, polyoxyethylene sorbitan alkyl ester, etc.

As for the surface active agent used in the present invention, the anionic surface active agent and/or the nonionic surface active agent are preferably employed, because they do not form a salt together with the acidic group included in the modified polymer compound, and accordingly, the water absorptivity of the modified polymer compound can be more prevented from deteriorated.

Now, a first Example of the present invention will be described below.

Here, samples of the Examples as water absorbers according to the present invention were actually manufactured to perform an evaluation between the Examples and Comparative Examples. However, the present invention is not limited thereto.

[Production of Modified Polymer Compound]

ABS resin waste of 1 part by weight was added to concentrated sulfuric acid of (96 wt %) 30 parts by weight and allowed to react with sulfuric acid for 20 minutes at 80° C. As the ABS resin waste, a resin employed for the black part of a guard panel of an 8 mm cassette tape, and having the content of styrene of 52 mole %, the content of acrylonitrile of 28 mole % and the content of butadiene of 20 mole %, and further including carbon black of 2 wt % was pulverized by a freezing shredder. Materials thus classified to 16 to 32 meshes were used.

After the reaction was finished, solid materials in a system were filtered by a glass filter and the filtered solid materials were rinsed, then neutralized with 1 normal sodium hydroxide solution of 50 parts by weight, further rinsed with adequate water, taken out when pH of filtered liquid reached 8 or lower and dried by a circulating air dryer for 2 hours at 105° C. According to these operations, black solid materials were obtained. It was recognized from the results of a sulfur element analysis that a sulfonic group in the solid materials occupied 33 mole % in all monomer units. The content of sodium had a substantially equal mole ratio to sulfonic group (1.1). The black solid materials were pulverized to have the average particle diameter of 0.8 mm.

[Production of Water Absorber]

A ferrite core (manganese zinc ferrite) of a flyback transformer which was generated in dismantling a used television and hardly disposed was used as magnetic materials according to the present invention. The magnetic materials were disposed in a flat state at equal intervals between two slightly thick cotton cloths and stitches were put therebetween to sew the two cotton cloths to each other so that the cotton cloth to which the ferrite core was sewed was manufactured. Further, one cotton cloth was combined with the cotton cloth to manufacture a bag. The bag was filled with the water absorbent modified polymer compound having a water absorptivity manufactured as mentioned above and sealed.

The water absorber according to the present invention has a water absorptivity and water absorbing speed higher than those of a conventional water absorber used for removing unnecessary water remaining due to a flood or the like or a water absorber having a function as a sandbag, and can adequately meet such a case in which a large amount of water needs to be absorbed or such a case in which water needs to be rapidly absorbed. Further, since the water absorber of the present invention can be applied not only to pure water, but also to water including electrolytes such as sea water, waste water, muddy water, etc., the water absorber of the present invention can be applied to the raising an embankment in the seaside or the prevention and restoration of the collapse of the embankment, or to the water leakage from factories.

Further, the present invention provides the water absorber especially useful for a sandbag, since the water absorber according to the present invention is low both in weight and volume upon its transportation, can be conveyed in large quantities and rapidly transported without depending on human power and absorbs water upon its use to adequately satisfy a function of a form followability for weight, volume and outline.

Now, a second Example of the present invention will be described below.

In the present invention, as the solid materials of specific gravity of 1 or higher, materials having magnetism can be used. The water absorber according to the present invention can be advantageously magnetically sucked and moved and transported by a crane or the like due to this magnetism. Further, the sandbag can be advantageously identified due to this magnetism.

As the materials having the magnetism, there may be exemplified materials having ferrimagnetism, ferromagnetism or parasitic magnetism. More specifically, as the ferromagnetic materials, there may be exemplified iron, nickel, cobalt or alloys of them, alloys including them, transition metals or alloys of them, and alloys including rare earth elements. Further, as the ferrimagnetic materials, there may be exemplified magnetite, maghemite, hematite, manganese zinc ferrite, manganese nickel ferrite, barium ferrite, strontium ferrite, etc. These materials may be composed of natural minerals, waste, or materials formed by binding waste. These materials have specific gravity higher than that of ordinary inorganic materials to greatly increase the weight of the water absorber. Thus, even the water absorber which absorbs water can relatively effectively increase its weight. More specifically, these materials can be obtained from inductor elements or speakers of used electric devices, or the deflection yokes of televisions. Since these members are hardly treated in the dismantling step of electronic devices, they are serviceable in view of effective use of them.

Here, a sample of the Example as a water absorber according to the present invention was manufactured to perform an evaluation between the Example and the Comparative Example. However, it is to be understood that the present invention is not limited thereto.

ABS resin waste of 1 part by weight was added to concentrated sulfuric acid of (96 wt %) 30 parts by weight and allowed to react with sulfuric acid for 20 minutes at 80° C. As the ABS resin waste, a resin employed for the black part of a guard panel of an 8 mm cassette tape, and having the content of styrene of 52 mole %, the content of acrylonitrile of 28 mole % and the content of butadiene of 20 mole %, and further including carbon black of 2 wt % was pulverized by a freezing shredder. Materials thus classified to 16 to 32 meshes were used.

After the reaction was finished, solid materials in a system were filtered by a glass filter and the filtered solid materials were rinsed, then neutralized with 1 normal sodium hydroxide solution of 50 parts by weight, further rinsed with adequate water, taken out when pH of filtered liquid reached 8 or lower and dried by a circulating air dryer for 2 hours at 105° C. According to these operations, black solid materials were obtained. It was recognized from the results of a sulfur element analysis that a sulfonic group in the solid materials occupied 33 mole % in all monomer units. The content of sodium had a substantially equal mole ratio to the sulfonic group (1.1). The black solid materials were pulverized to have the average particle diameter of 0.8 mm.

The black solid materials were dispersed in cyclohexane. A gauze was dipped in the obtained solution and coated therewith and dried. Thus, a supporter was impregnated with a water absorbent modified polymer compound. The dried sheet type member was cut into pieces. The sheet type pieces pressed under static pressure at 100° C. were laminated and a bag formed by a slightly thick cotton cloth was filled with the laminated pieces and sealed.

COMPARATIVE EXAMPLE 1

The bag formed with the same cloth and the same shape as described above was filled with the above described pulverized black solid materials of the same weight which were prepared in the Example and sealed to manufacture a water absorber.

The water absorbers obtained in the Example 2 and the Comparative Example 1 were arranged on an even water surface having the depth of water of 1 cm. Water absorbing, swelling and solar drying operations were repeated 5 times. As a result, a little bleeding of the modified polymer compound was observed in the Comparative Example 1. Further, there was generated an unevenness in the distribution of the water absorbent modified polymer compound in the water absorber. On the other hand, in the water absorber of the Example, the bleeding of the water absorbent modified polymer compound was not observed. Further, there was not generated an unevenness in the distribution of the modified polymer compound in the water absorber.

Now, a third Example of the present invention will be described below.

In the present invention, solid materials of specific gravity of 1 or higher can be included in the water permeable bag type member. In such a way, when the water absorber of the present invention is used as a sandbag, the water absorber is conveniently hardly made to flow by water or the like especially during an initial stage of its installation.

As the solid materials of specific gravity of 1 or higher of the present invention, there may be exemplified a solid material made of natural minerals, a solid material made of waste and a solid material formed by binding waste. As materials of them, there are exemplified metal, ceramics, glass, or materials formed by binding them together. For binding them, polymer materials of specific gravity of 1 or lower can be used. The polymer materials used for binding are not especially limited to specific materials. There are enumerated, for example, polystyrene, styrene-propylene copolymer, styrene-butadiene copolymer, styrene-vinyl chloride copolymer, styrene-vinyl acetate copolymer, styrene-acrylic ester copolymer, styrene-methacrylic ester copolymer, polyester resin, polyvinyl alcohol, water soluble resins such as casein, sodium polyacrylate, etc., alcohol soluble resins such as copolymer nylon, methoxymethylated nylon, etc., curing type resins forming three-dimensional network structures such as polyurethane, melamine resin, epoxy resin, etc.

In this Example, as the solid materials of specific gravity of 1 or higher, materials having magnetism can be used. The water absorber according to the present invention can be advantageously magnetically sucked and moved and transported by a crane or the like due to this magnetism. Further, the sandbag can be advantageously identified due to this magnetism.

The materials having the magnetism are the same as; those described in the second Example.

Here, a sample was actually manufactured in the Example as a water absorber according to the present invention to perform an evaluation between the Example and the Comparative Example. However, it is to be understood that the present invention is not limited thereto.

[Manufacture of Modified Polymer Compound having Antimicrobial Property]

SAN resin waste of 1 part by weight was added to concentrated sulfuric acid of (96 wt %) 30 parts by weight and allowed to react with sulfuric acid for 20 minutes at 80° C. As the SAN resin waste, a resin employed for the transparent part of a guard panel of an 8 mm cassette tape, and having the content of styrene of 60 mole % and the content of acrylonitrile of 40 mole % was pulverized by a freezing shredder. Materials thus classified to 16 to 32 meshes were used.

After the reaction was finished, solid materials in a system were filtered by a glass filter and the filtered solid materials were rinsed, then neutralized with 1 normal sodium hydroxide solution of 50 parts by weight, and further rinsed with adequate water. This filtered cake was dispersed in pure water of 1000 parts by weight. The 1.0 M aqueous solution of copper sulfate pentahydrate of 10 parts by weight was added to the cake, and the obtained product was adequately agitated, rinsed and filtered. The obtained material was dried for 3 hours at 100° C. by a circulating air dryer. According to these operations, brown solid materials were obtained. A sulfonic group included in the solid materials occupied 36 mole % in all monomer units. The content of copper was 0.91 in terms of mole ratio to the sulfonic group.

[Manufacture of Modified Polymer Compound having Water Absorptivity]

ABS resin waste of 1 part by weight was added to concentrated sulfuric acid of (96 wt %) 30 parts by weight and allowed to react with sulfuric acid for 20 minutes at 80° C. As the ABS resin waste, a resin employed for the black part of a guard panel of an 8 mm cassette tape, and having the content of styrene of 52 mole %, the content of acrylonitrile of 28 mole % and the content of butadiene of 20 mole %, and further including carbon black of 2 wt % was pulverized by a freezing shredder. Materials thus classified to 16 to 32 meshes were used.

After the reaction was finished, solid materials in a system were filtered by a glass filter and the filtered solid materials were rinsed, then neutralized with 1 normal sodium hydroxide solution of 50 parts by weight, further rinsed with adequate water, taken out when pH of filtered liquid reached 8 or lower and dried by a circulating air dryer for 2 hours at 105° C. According to these operations, black solid materials were obtained. It was recognized from the results of a sulfur element analysis that a sulfonic group in the solid materials occupied 33 mole % in all monomer units. The content of sodium had a substantially equal mole ratio to the sulfonic group (1.1). The black solid materials were pulverized to have the average particle diameter of 0.8 mm.

[Manufacture of Water Absorber]

The modified polymer compound having the antimicrobial property of 5 parts by weight was mixed with the modified polymer compound having the water absorptivity of 95 parts by weight and the mixture was pulverized, and further uniformly mixed. The average particle diameter of the pulverized materials was 0.8 mm.

The pulverized materials were dispersed in cyclohexane. A gauze was dipped in the obtained solution and coated therewith and dried. The modified polymer compound was adhered to a supporter. A dried sheet type member was cut into pieces. The sheet type pieces pressed under static pressure at 100° C. were laminated and a bag formed by a slightly thick cotton cloth was filled with the laminated pieces and sealed to form a water absorber.

COMPARATIVE EXAMPLE 2

The bag formed with the same cloth and the same shape as described above was filled with the above described pulverized black solid materials of the same weight which were prepared in the Example and sealed to manufacture a water absorber.

The water absorbers obtained in the Example 3 and the Comparative Example 2 were arranged on an even water surface having the depth of water of 1 cm. Water absorbing, swelling and solar drying operations were repeated 5 times. As a result, a little bleeding of the water absorbent modified polymer compound was observed in the Comparative Example 2. Further, there was generated an unevenness in the distribution of the water absorbent modified polymer compound in the water absorber. On the other hand, in the water absorber of the Example 3, the bleeding of the water absorbent modified polymer compound was not observed. Further, there was not generated an unevenness in the distribution of the water absorbent modified polymer compound in the water absorber.

Now, a fourth Example of the present invention will be described below.

Here, a sample was actually manufactured in the Example as a water absorber according to the present invention to perform an evaluation between the Example and the Comparative Example. However, it is to be understood that the present invention is not limited thereto.

[Manufacture of Water Absorbent Polymer Compound]

Since the components and conditions for preparing the water absorbent polymer compound are the same as those of the above-described third Example, the repeated explanation of them will be omitted.

[Manufacture of Water Absorber]

The above-described black solid materials were pulverized and the average particle diameter of the pulverized materials was 0.8 mm. The pulverized black materials were dispersed in cyclohexane. A gauze was dipped in the obtained solution and coated therewith and dried. Thus, the water absorbent modified polymer compound was adhered to a flexible network member or the flexible network member was impregnated with the water absorbent modified polymer compound. A dried sheet type member was pressed at 100° C. Sodium lauryl sulfate solution was atomized to both the surfaces of the sheet type member and dried. The sheet type member was cut to pieces. The sheet type pieces were laminated. A bag formed by a slightly thick cotton cloth impregnated with sodium lauryl sulfate was filled with the laminated pieces and sealed. The content of sodium lauryl sulfate was estimated to be located within a range of 1% to 0.1% as much as the weight of the water absorber in a dry state.

COMPARATIVE EXAMPLE 3

A water absorber was manufactured in the same manner as that of the Example 4 only excluding the sodium lauryl sulfate as a surface active agent in the fourth Example.

The water absorbers of the same forms obtained in the fourth Example and the Comparative Example 3 were arranged on an even water surface having the depth of water of 1 cm to estimate the water absorbing and swelling speed in accordance with the change of thickness of the water absorbers. Before the water absorbers were immersed in the water, they had substantially the same thickness, however, the thickness after one minute was 2.1 cm in the Example and 1.6 cm in the Comparative Example. Thus, it was apparently recognized that the use of the surface active agent improved the water absorbing speed.

Now, a fifth Example of the present invention will be described.

Here, a sample was actually manufactured in the Example as a water absorber according to the present invention to perform an evaluation between the Example and the Comparative Example. However, it is to be understood that the present invention is not limited thereto.

[Manufacture of Modified Polymer Compound]

ABS resin waste of 1 part by weight was added to concentrated sulfuric acid of (96 wt %) 30 parts by weight and allowed to react with sulfuric acid for 20 minutes at 80° C. As the ABS resin waste, a resin employed for the black part of a guard panel of an 8 mm cassette tape, and having the content of styrene of 52 mole %, the content of acrylonitrile of 28 mole % and the content of butadiene of 20 mole %, and further including carbon black of 2 wt % was pulverized by a freezing shredder. Materials thus classified to 16 to 32 meshes were used.

After the reaction was finished, solid materials in a system were filtered by a glass filter and the filtered solid materials were rinsed, then neutralized with 1 normal sodium hydroxide solution of 50 parts by weight, further rinsed with adequate water, taken out when pH of filtered liquid reached 8 or lower and dried by a circulating air dryer for 2 hours at 105° C. According to these operations, black solid materials were obtained. It was recognized from the results of a sulfur element analysis that a sulfonic group in the solid materials occupied 33 mole % in all monomer units. The content of sodium had a substantially equal mole ratio to the sulfonic group (1.1). The black solid materials were pulverized to have the average particle diameter of 0.8 mm.

[Manufacture of Water Absorber]

In forming a water absorber, materials to be used and forming conditions are the same as those of the above-described first Example, and accordingly, the description of them will be omitted.

Consequently, according to a method for conveying a water absorber of the present invention, the water absorbers used for removing unnecessary water remaining due to water leakage or flood or the like or the water absorbers having functions as sandbags can be rapidly conveyed in large quantities at a time even to a risky place for persons to move.

INDUSTRIAL APPLICABILITY

As described above, the present invention provides a water absorber especially useful for a sandbag and suitable for a conveying method according to the present invention, since the water absorber according to the present invention is low both in weight and volume upon its transportation, and absorbs water upon its use to adequately satisfy a function of a form followability for weight, volume and outline. Further, the water absorber according to the present invention can be advantageously repeatedly used. Further, since a salt forming modified polymer compound included in the water absorber according to the present invention has an antimicrobial property, the adhesion and breeding of microorganisms due to the repeated use and the discoloration of the water absorber and offensive odor from the water absorber caused therefrom can be advantageously suppressed.

Additionally, the water absorber of the present invention has a water absorptivity and a water absorbing speed higher than the conventional water absorber used for removing unnecessary water remaining due to water leakage or flood or the water absorber having a function as a sandbag and can adequately meet such a case in which a large amount of water needs to be absorbed or such a case in which water needs to be rapidly absorbed. Further, since the water absorber of the present invention can be applied not only to pure water, but also to water including electrolytes such as sea water, waste water, muddy water, etc., the water absorber of the present invention can be applied to the raising an embankment in the seaside or the prevention and restoration of the collapse of the embankment, or to the water leakage from factories.

The water absorber according to the present invention can be manufactured by employing used resins or wastes, and further solid materials of specific gravity of 1 or higher included as desired can be manufactured by using members hardly treated in the dismantling step of electronic devices. Accordingly, the water absorber can advantageously contribute to a global environment.

What is claimed is:

1. A water absorber comprising: solid materials with a manganese zinc ferrite core, a modified polymer compound, and a supporter, in a water permeable bag; wherein the modified polymer compound comprises: (a) acrylonitrile and at least one or more kinds of (b) styrene and/or conjugated dienes, modified with an acidic group which is a sulfonic group, introduced by an acidifying process with sulfuric anhydride.

2. A method for producing a water absorber wherein solid materials with a manganese zinc ferrite core, a modified polymer compound, and a supporter are put in a water permeable bag member, wherein the modified polymer compound is manufactured by introducing an acidic group to a polymer compound comprising (a) acrylonitrile and at least one or more kinds of (b) styrene and/or conjugated dienes, and wherein the acidic group is a sulfonic group introduced by an acidifying process with sulfuric anhydride.

* * * * *